United States Patent [19]

Winters

[11] Patent Number: 5,463,304
[45] Date of Patent: Oct. 31, 1995

[54] LIFE EXTENDING CIRCUIT FOR STORAGE BATTERIES

[76] Inventor: Thomas L. Winters, 1921 Bay Crest, Santa Ana, Calif. 92704

[21] Appl. No.: 157,662

[22] Filed: Nov. 22, 1993

[51] Int. Cl.[6] .............................. H02J 7/02; H01M 10/44; H01M 10/46
[52] U.S. Cl. ................................ 320/4; 320/21
[58] Field of Search .......................... 320/4, 13, 14, 320/21, 49, 50

[56] References Cited

U.S. PATENT DOCUMENTS

| | | | |
|---|---|---|---|
| 2,341,446 | 2/1944 | Klinkhamer et al. | |
| 2,377,180 | 5/1945 | Pohm. | |
| 2,763,827 | 9/1956 | Evans | 363/75 |
| 3,963,976 | 6/1976 | Clark | 320/21 |
| 4,419,765 | 12/1983 | Wycoff et al. | 455/36 |
| 4,629,963 | 12/1986 | Morris | 320/21 X |
| 4,736,150 | 4/1988 | Wagner | 320/21 |
| 4,931,367 | 6/1990 | Brecht | 320/4 X |
| 4,935,688 | 6/1990 | Mistry et al. | 320/4 |

*Primary Examiner*—Peter S. Wong
*Assistant Examiner*—Edward Tso
*Attorney, Agent, or Firm*—Hawes & Fischer

[57] ABSTRACT

A low cost, relatively inexpensive and highly reliable tuned resonant circuit and method for prolonging the life of storage batteries of the type that contain a liquid electrolyte and are exposed to extensive periods of non-use. The resonant circuit is powered from a commercially available AC voltage source that is connected through a capacitor and a step down transformer to the input of a full wave diode rectification bridge. The output of the bridge rectifier is connected across the power terminals of the storage battery so as to supply a steady pulsating DC voltage thereto. By virtue of the foregoing, the battery electrolyte is excited so that the specific gravity thereof will be maintained at the original operating level of the electrolyte in a fully charged storage battery.

14 Claims, 2 Drawing Sheets

LIFE EXTENDING CIRCUIT FOR STORAGE BATTERIES

BACKGROUND OF THE INVENTION

1. Field of the Invention

This invention relates to a low cost, highly efficient tuned resonant circuit and method that are particularly applicable to prolonging the life of storage batteries of a type that contain a liquid electrolyte and are exposed to extensive periods of non-use.

2. Background Art

As will be known to those skilled in the art, there has been a long-standing need for a reliable means by which to prolong the life of storage batteries of the type having a liquid electrolyte. That is, storage batteries are frequently removed from service and subjected to long periods of non-use, as well as excessive cold, heat, moisture and other atmospheric conditions. In many cases, storage batteries lay dormant and/or are overcharged for months, and possibly years on end. More particularly, conventional battery chargers tend to abuse the storage battery by applying an excessive charge thereto. As a consequence of using a conventional battery charger, and as will be described in greater detail below, the life of the storage battery may actually be shortened, thereby resulting in waste and the need for frequent replacements.

Reference may be made to the following patents for examples of known battery charging circuits:

FR 1,110,004 Feb. 6, 1956

U.S. Pat. No. 2,341,446 Feb. 8, 1944

U.S. Pat. No. 2,377,180 May 29, 1945

U.S. Pat. No. 2,763,827 Sep. 18, 1956

Reference may also be made to the following patents for examples of known techniques for prolonging the life of lead-acid storage batteries:

U.S. Pat. No. 4,931,367 Jun. 5, 1990

U.S. Pat. No. 4,935,688 Jun. 19, 1990

Notwithstanding the foregoing, it would be desirable to have available a simple, low cost and reliable means for prolonging the life of a lead-acid storage battery while avoiding the use of conventional battery chargers and the limitations that are characteristic thereof.

SUMMARY OF THE INVENTION

Disclosed is a simple, low cost and efficient tuned resonant circuit and method for prolonging the life of lead-acid storage batteries that are exposed to frequent and/or extensive periods of non-use. The resonant circuit includes an LC network and a voltage conversion network interconnected with one another at a step down transformer. The circuit, which is lightly fused, is powered from a commercially available 110 volt AC source. The LC network includes a capacitor that is connected between the AC source and the primary winding of the step down transformer. The voltage conversion network includes the secondary winding of the transformer which is connected to the input of a full wave diode rectification bridge. The output of the bridge rectifier is connected across the power terminals of a storage battery that is to be taken out of service and possibly exposed to an extensive period of non-use.

In operation, the tuned resonant circuit of this invention provides a series of tiny DC pulses to be applied from the output of the bridge rectifier to the power terminals of the battery. This pulsating DC voltage has been found to excite the liquid electrolyte of the battery. Accordingly, the specific gravity of the electrolyte is maintained at the operating level of an electrolyte that would be found in a fully charged battery so that the life of the storage battery is preserved even after the battery has been idle for a long time. By virtue of the foregoing, the battery is ready to be immediately returned to active service while avoiding the harmful effects of overcharging (e.g. the destruction of the battery plates) that are known to occur from employing conventional battery charging circuits.

DETAILED DESCRIPTION

Figure 1:
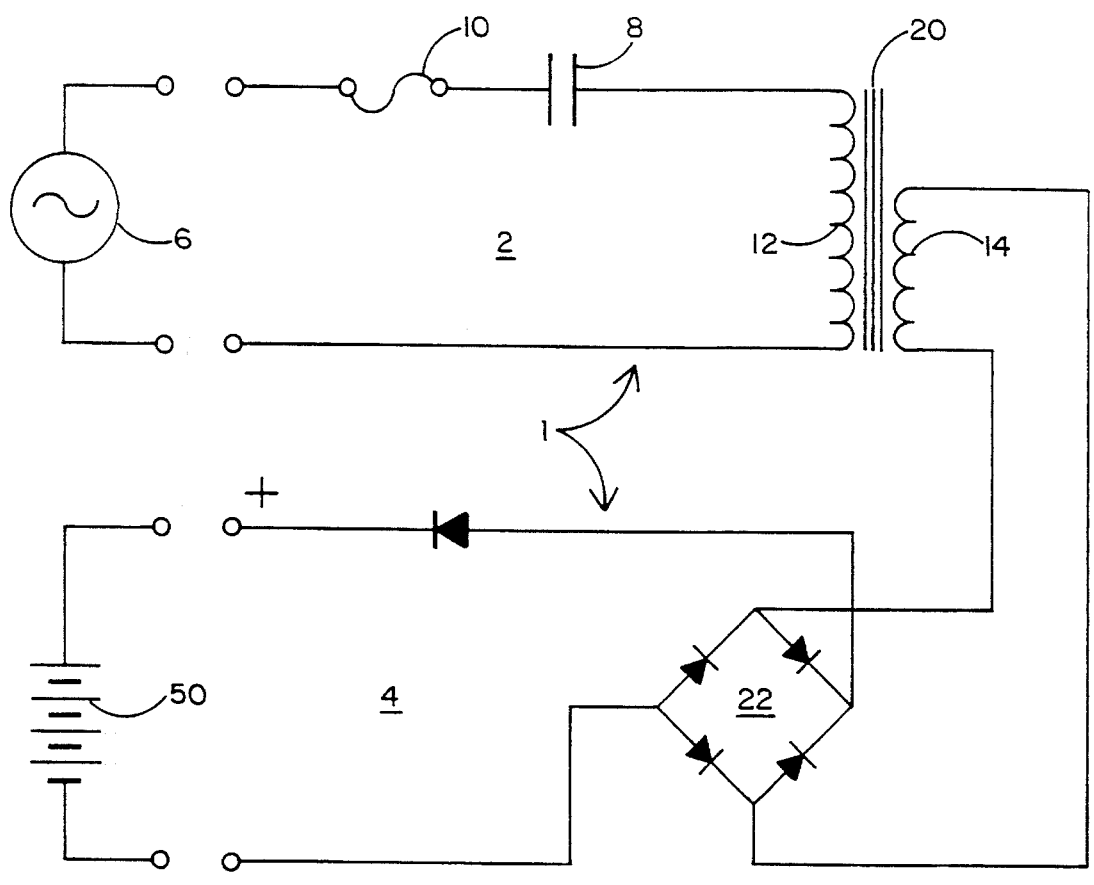
FIG. 1 is schematic of the tuned resonant circuit of the present invention for extending the life of lead-acid storage batteries.

FIG. 1 of the drawings illustrates a tuned resonant circuit 1 which is adapted to provide a pulsating DC voltage to excite the electrolyte and thereby prolong the life of a lead-acid storage battery 50, particularly when the battery is out of service for a long period of time. The circuit 1 includes an LC network 2 and a voltage conversion network 4 that are coupled together at a step down transformer 20. The LC network 2 of circuit 1 is powered from a commercially available 60 Hz, 110 volt AC source 6. The LC network 2 is tuned to 120 Hz and includes a (e.g. 0.33 Mfd) capacitor 8. One plate of capacitor 8 is connected to the AC power source 6 by way of a ⅜ amp fuse 10. The other plate of capacitor 8 is connected in electrical series with the primary winding 12 of step down transformer 20 which, in turn, is connected to the neutral terminal of source 6. By way of example, the step down transformer 20 used in circuit 1 is rated at 115 volts/12.6 volts.

The voltage conversion network 4 of resonant circuit 1 includes a conventional full wave diode rectification bridge 22. The bridge rectifier 22 is connected between the secondary winding 14 of transformer 20 and the storage battery 50. More particularly, the transformer 20 acts as an inductance coupled in parallel with the input to diode bridge 22. Similarly, the output of diode bridge 22 is connected to the power terminals of storage battery 50 by way of a diode 24.

Figure 2:
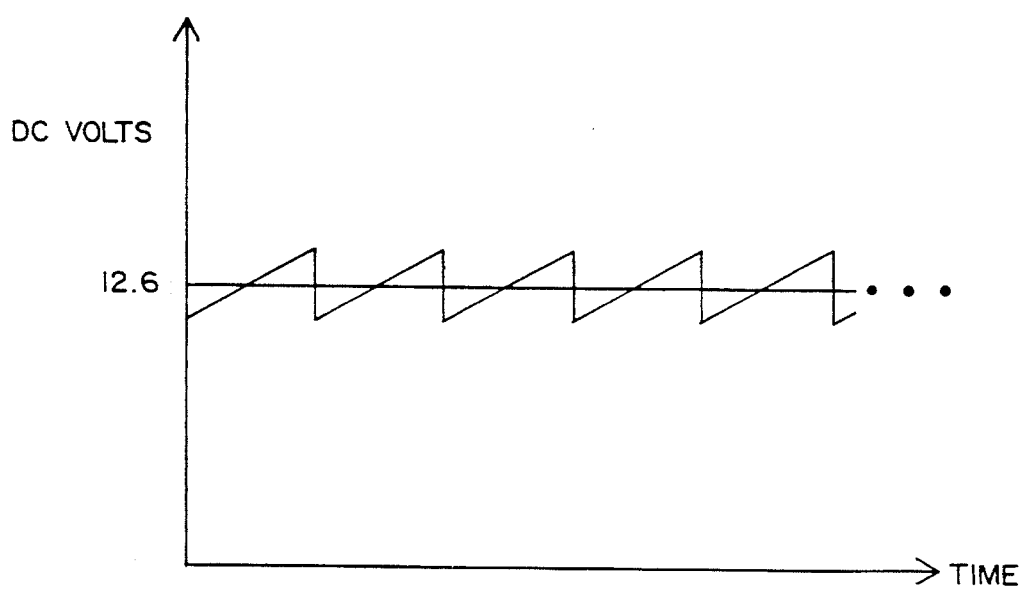
FIG. 2 represents the output waveform of the resonant circuit of FIG. 1.

By virtue of the tuned resonant circuit 1 herein disclosed, and as is best shown in FIG. 2 of the drawings, a series of tiny DC pulses are applied from the output of bridge rectifier 22 to the storage battery 50 which is connected to the output terminals of circuit 1. It is preferable that the output voltage of resonant circuit 1 have a reference level of approximately 12.6 volts DC with a peak-to-peak voltage of 0.3 volts.

In accordance with the present invention, the pulsating DC output voltage which is supplied from circuit 1 to the storage battery has been found to excite the electrolyte thereof. By virtue of the foregoing, the specific gravity of the electrolyte can be maintained at the original level of an electrolyte in a fully charged battery so as to preserve the life of the battery and avoid premature battery failure as would otherwise be likely to occur as a consequence of remaining idle. Therefore, the battery will not discharge with prolonged periods of non-use or after being exposed to extremely cold temperature, but will otherwise remain fully charged and ready for immediate return to active service. By way of example, where the electrolyte of a storage battery contains sulfuric acid, the tuned resonant circuit 1 of FIG. 1 was found capable of providing a pulsating DC voltage to the battery terminals so as to maintain the specific gravity of the electrolyte at or near 12.6, the level at which the battery is considered to be fully charged.

Figure 3:
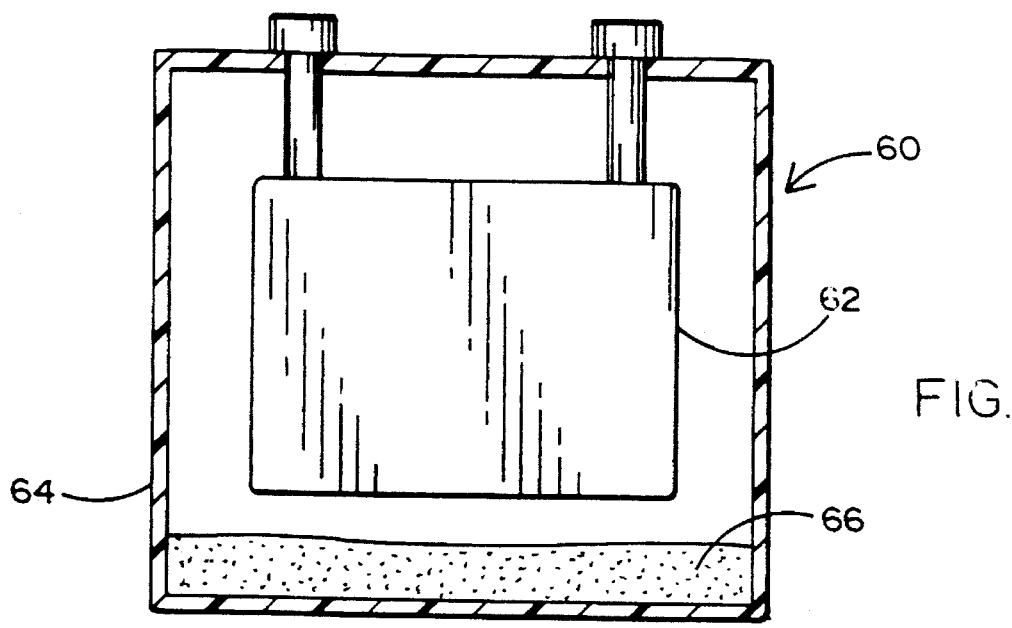
FIG. 3 illustrates a storage battery after being connected to a conventional battery charging circuit.

Prior art charging circuits are not known for properly or reliably treating the liquid electrolyte of a lead-acid storage battery, because of the resulting abuse to which the battery is often subjected. In particular, and as shown diagrammatically at FIG. 3 of the drawings, the conventional battery charger is often characterized as providing a very high input current to a storage battery 60. Therefore, after several (e.g. three) years of life during which the battery 60 experiences many cycles of excessive charging followed by long periods of storage, the battery plates 62 are likely to undergo massive deterioration. As a result of the foregoing, portions of the plates 62 will settle to the bottom of the battery casing 64 as a large mass of grey matter 66. The life of such a battery 60 will be undesirably shortened to a few years thereby resulting in waste and the need for frequent replacements.

Figure 4:
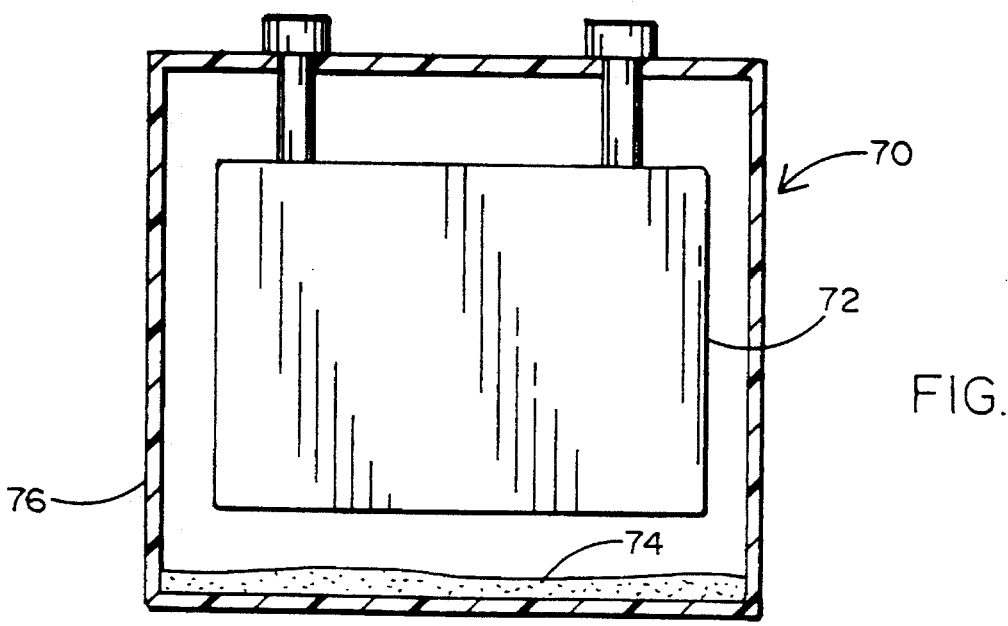
FIG. 4 illustrates a storage battery after being connected to the resonant circuit of FIG. 1.

On the other hand, and as shown diagrammatically at FIG. 4 of the drawings, an identically aged lead-acid storage battery 70 connected to the tuned resonant circuit 1 of FIG. 1 will be able to avoid being excessively charged as would otherwise occur had a conventional battery charger been repeatedly used for maintaining the battery in a charged state. In the case of FIG. 4, the plates 72 of battery 70 will not suffer massive deterioration (as do the plates 62 of the battery 60 of FIG. 3), and only a small deposit 76 will fall to the bottom of the battery casing 76. Accordingly, the life of the battery 70 may be prolonged well beyond that of the battery 60 of FIG. 3, while the need for finding a battery replacement would be correspondingly reduced.

The resonant circuit herein above described when referring to FIG. 1 may be surrounded by a housing (not shown) that is manufactured from an impact resistant, waterproof material (e.g. plastic) with deep dimensions (e.g. 6"×6"×4") so as to be relatively indestructible for virtually all applications. For example, resonant circuit 1 has particular application in the marine and motor home industries, as well as other industries that require batteries which contain an electrolyte and are frequently exposed to periods of non-use. The resonant circuit 1 of this invention draws only small current, generates little heat and is relatively inexpensive to manufacture. Therefore, the circuit has been found to be both an efficient and reliable means for maintaining storage batteries in a charged and ready to use condition while overcoming the shortcomings common to conventional battery charging circuits. However, it is to be understood that circuit 1 is not a battery charger in the traditional sense, but a battery life extender which acts on the electrolyte of a storage battery to maintain the specific gravity thereof.

It will be apparent that while a preferred embodiment of the invention has been shown and described, various modifications and changes may be made without departing from the true spirit and scope of the invention.

Having thus set forth the preferred embodiment, what is claimed is:

1. A resonant circuit to prolong the life of a storage battery during periods of non-use, where said storage battery contains a liquid electrolyte, said resonant circuit having input terminal means to be connected to a 110 volt AC source and output terminal means to be connected to the power terminals of the storage battery to provide an output voltage thereto, said resonant circuit comprising a step down transformer having primary and secondary windings, a capacitor connected between said input terminal means and the primary winding of said step down transformer and an electrical rectifier connected between the secondary winding of said transformer and said output terminal means for providing a pulsed DC output voltage to said power terminals.

2. The resonant circuit recited in claim 1, wherein said electrical rectifier is a full wave diode bridge having an input and an output.

3. The resonant circuit recited in claim 2, wherein the secondary winding of said transformer is connected to the input of said full wave diode bridge.

4. The resonant circuit recited in claim 2, wherein the output of said full wave diode bridge is connected across the power terminals of said battery by way of said output terminal means.

5. The resonant circuit recited in claim 1, further comprising a fuse connected between said input terminal means and the primary winding of said transformer.

6. The resonant circuit recited in claim 1, further comprising a diode connected between said electrical rectifier and said output terminal means.

7. The resonant circuit recited in claim 1, wherein said capacitor and the primary winding of said transformer form a LC network that is tuned to a frequency that is a harmonic of the frequency of said AC voltage source.

8. The resonant circuit recited in claim 1, wherein said pulsed DC output voltage that is supplied to said power terminals has a sawtooth waveform.

9. A method for prolonging the life of a storage battery during periods of non-use, where said storage battery contains a pair of power terminals and a liquid electrolyte having a specific gravity, the magnitude of the specific gravity depending upon whether the storage battery is fully charged, said method comprising the steps of maintaining the magnitude of the specific gravity of the liquid electrolyte of the storage battery at or near the magnitude of the specific gravity of an identical liquid electrolyte in a fully charged storage battery by supplying a pulsating DC voltage having a series of pulses that form a sawtooth waveform across the power terminals of the storage battery so that the pulses of said sawtooth waveform are symmetrical with respect to the average DC voltage of said pulsating voltage.

10. The method recited in claim 9, including the additional step of supplying said pulsating DC voltage by means of a resonant circuit including rectification means having an input and an output, said rectification means receiving an AC voltage at said input thereof and providing said DC voltage from said output thereof to the power terminals of the storage battery.

11. The method recited in claim 10, including the additional step of forming said resonant circuit with a transformer having primary and secondary windings, said primary winding connected to an AC voltage source and said secondary winding connected to the input of said rectification means.

12. The method recited in claim 11, including the additional steps of connecting a capacitor between the primary winding of said transformer and said AC voltage source, such that said capacitor and said primary winding form an LC circuit, and tuning said LC circuit to a frequency that is a harmonic of the frequency of said AC voltage source.

13. A resonant circuit to prolong the life of a storage battery during periods of non-use, where said storage battery contains a pair of power terminals and a liquid electrolyte, said resonant circuit having input terminal means to be connected to a 110 volt AC voltage source and output terminal means to be connected to the power terminals of the storage battery to provide an output voltage thereto, said resonant circuit comprising a transformer having primary and secondary windings, a capacitor connected between said input terminal means and the primary winding of said transformer such that said capacitor and said primary winding form an LC network that is tuned to a frequency that is a harmonic of the frequency of the 110 volt AC voltage source, and an electrical rectifier connected between the secondary winding of said transformer and said output terminal means for providing a pulsed DC output voltage to said power terminals.

14. The resonant circuit recited in claim 13, wherein said pulsed DC output voltage provided to said power terminals has a sawtooth waveform.

* * * * *